(12) United States Patent
Dukhin et al.

(10) Patent No.: US 9,476,759 B2
(45) Date of Patent: Oct. 25, 2016

(54) METHOD FOR DETERMINING PORE SIZE AND PORE SIZE DISTRIBUTION OF POROUS MATERIAL USING PHASE OF ELECTRO-ACOUSTIC SIGNAL

(71) Applicants: Andrei S. Dukhin, Goldens Bridge, NY (US); Matthias Thommes, Royal Palm Beach, FL (US)

(72) Inventors: Andrei S. Dukhin, Goldens Bridge, NY (US); Matthias Thommes, Royal Palm Beach, FL (US)

(73) Assignee: Quantachrome Corporation, Boynton Beach, FL (US)

( * ) Notice: Subject to any disclaimer, the term of this patent is extended or adjusted under 35 U.S.C. 154(b) by 484 days.

(21) Appl. No.: 13/864,782

(22) Filed: Apr. 17, 2013

(65) Prior Publication Data
US 2013/0269442 A1    Oct. 17, 2013

Related U.S. Application Data

(60) Provisional application No. 61/625,456, filed on Apr. 17, 2012.

(51) Int. Cl.
  *G01H 3/00*  (2006.01)
  *G01V 11/00* (2006.01)

(52) U.S. Cl.
  CPC .............. *G01H 3/00* (2013.01); *G01V 11/007* (2013.01)

(58) Field of Classification Search
  CPC ....................................................... G01H 3/00
  See application file for complete search history.

(56) References Cited

U.S. PATENT DOCUMENTS

| 4,644,283 A * | 2/1987 | Vinegar ................. G01V 3/265 324/362 |
| 4,947,677 A * | 8/1990 | Frye .................... G01N 15/0893 73/38 |
| 5,503,001 A * | 4/1996 | Wong ..................... G01V 3/265 324/351 |

OTHER PUBLICATIONS

Lowell, S., Shields, J.E., Thomas, M.A. and Thommes, M. "Characterization of porous solids and powders:surface area, pore size and density", Kluwer Academic Publishers, The Netherlands, (2004).
Frenkel J. "On the Theory of Seismic and Seismoelectric Phenomena in a Moist Soil", J. of Physics, USSR, vol. 3, 5, pp. 230-241 [1944], re-published J. Engineering Mechanics, (2005).
(Continued)

*Primary Examiner* — John Fitzgerald
*Assistant Examiner* — Herbert K Roberts
(74) *Attorney, Agent, or Firm* — Robert M. Schwartz; Alfred K. Dassler

(57) ABSTRACT

A method of determining pore size of a porous material. The method includes saturating the porous material with a conducting liquid. Measuring, with an electro-acoustic device, a phase of the seismo-electric or electro-seismic signal at a single frequency or multiple frequencies. Calculating an average pore size from the measured phase of the seismo-electric or electro-seismic signal at single frequency using a theory that takes into account the hydrodynamic relaxation of the conducting liquid inside of the pores of the porous material. Calculating pore size distribution from the similar measurement conducted at multiple frequencies using the same theory.

4 Claims, 4 Drawing Sheets

(56) References Cited

OTHER PUBLICATIONS

Biot, M.A. Theory of propagation of elastic waves in a fluid-saturated porous solid. 1. Low frequency range. J. Acoustic Society of America, vol. 28, 2, pp. 168-178 (1956).
Biot, M.A. Theory of propagation of elastic waves in a fluid-saturated porous solid. 1. High frequency range. J. Acoustic Society of America, vol. 28, 2, pp. 179-191 (1956).
Lyklema, J., "Fundamentals of Interface and Colloid Science", vol. 1-3, Academic Press, London—NY, (1995-2000).
International Standard ISO 13099 Part 1 "Colloidal systems—Methods for zeta-potential determination—Part 1. Electroacoustic and electrokinetic phenomena", (2012).
Ivanov, A.G. Bull. Academy of Sciences, USSR, Serie geographique et geophysique, No. 5, 699, (1940).
Williams M., "An Electrokinetic Transducer", The review of scientific instruments, 19, 10, 64-645 (1948).
Dukhin, A. S. Observation of sol-gel transition for carbon nanotubes using electroacoustics: Colloid vibration current versus streaming vibration current. JCIS, 310, 1, 270-280 (2007).
Muller, E. and Mann, C. "Resin characterization by electro-acoustic measurements", J. of Chromatography A, 1144, 30-39, (2007).
Dukhin, A.S. and Goetz, P.J. "Ultrasound for characterizing liquids, nano- and micro-particulates, and porous bodies", Elsevier (2010).
Markov, M.G. "Simulation of the electroseismic effect produced by an acoustic multipole source in a fluid-filled borehole", SPWLA 45th Annual Logging Symposium, (2004).
Zhu, Z., Burns, D.R. and Toksoz, M.N. "Electroseismic and seismoelectric measurements of rock samples in a water tank", MIT (2007).
Zhu, Z., Haarsten, M.W. and Toksoz, M.N. "Experimental studies of electrokinetic conversion in fluid-saturated borehole", Geophysics, 64, 1349-1356 (1999).
Zhu, Z., Toksoz, M.F. and Burns, D. R. "Electroseismic and seismoelectric measurement of rock samples in water tank", Geophysics, 73, E153 (2008).
Pride, S.R. and Haartsen, M.W. "Electroseismic waves properties", J. Acoust.Soc.Amer., 100, 1301-1315 (1996).
Pride, S.R. "Govering equations for the coupled electromagnetic and acoustics of porous media", Physical Review, B, 50, 15678-15696 (1994).
Haarsten, M.W. and Pride, S.R. "Electroseismic waves from point sources in layered media", J. of Geophysical Research, 102, 24745-24769 (1997).
Mikhailov, O., Queen, J. and Toksoz, M.N. "Using borehole seismic measurements to detect and characterize fractured zones", Geophysics, 65, 1098-1112 (2000).
Thomson, A. and Gist, G. "Geophysical applications of electrokinetic conversion", The Leading Edge, 12, 1169-1173 (1993).
Reppert, P.M. and Morgan, F.D. "Frequency dependent electrosmosis", J. Colloid and Interface Science, 254, 372-383 (2002).
Dukhin, A.S. and Shilov , V.N. "Seismoelectric effect.: A non-isochoric streaming current. 2. Theory", J. Colloid and Interface Science, 346, p. 248-253 (2010).
Dukhin, A.S., Goetz, P.J, and Thommes, M. "Seismoelectric effect.: A non-isochoric streaming current. 1. Experiment", J. Colloid and Interface Science, 345, p. 547-553 (2010).
G. Reichenauer, Micropore adsorption dynamics in synthetic hard carbons, Adsorption 11 467-471 (2005).
Dukhin, A.S., Swasey, S. and Thommes, M. "A method for pore size and porosity analysis of porous materials using electroacoustics and high frequency conductivity", Colloids and Surfaces, (2013).

\* cited by examiner

METHOD FOR DETERMINING PORE SIZE AND PORE SIZE DISTRIBUTION OF POROUS MATERIAL USING PHASE OF ELECTRO-ACOUSTIC SIGNAL

CROSS REFERENCE TO RELATED APPLICATIONS

This application claims the benefit and priority from U.S. Provisional Patent Application Ser. No. 61/625,456, filed on Apr. 17, 2012, and entitled Method for Determining Porosity, Pore Size and Zeta Potential of Porous Bodies, this prior application is incorporated herein by reference in its entirety.

FIELD OF THE INVENTION

Characterization of porous bodies in terms of pore size.

BACKGROUND OF THE INVENTION

This invention deals with a particular kind of heterogeneous system, which can be described as a porous body consisting of a continuous solid matrix with embedded pores that can be filled with either gas or liquid. According to S. Lowell et al, the spatial distribution between the solid matrix and pores can be characterized in terms of a porosity and pore size. According to J. Frenkel and M. A. Biot, the mechanical properties of such systems with respect to any applied oscillating stress depend primarily on the viscoelastic properties of the matrix. Lyklema notes that when such porous bodies are saturated with liquid, additional properties are then related to any surface charge on these pores, which in turn is commonly characterized by a zeta potential. Although methods exist for characterizing these mechanical and electrical properties, they all have limitations and call out for improvement. Here we suggest a method for determination of pore sizes using electroacoustic measurement.

Propagation of ultrasound through a wetted porous material generates electric response that is known as seismoelectric effect. There is also reverse effect generated with oscillating (AC) electric field when it is applied to a wetted porous material. It generates ultrasound wave. This effect is called electro-seismic effect. Both of the effects belong to the family of electroacoustic phenomena according to ISO standard 13099 Part 1.

Both of the electroacoustic effects occur in porous materials due to existence of electric charges on surfaces of the wetted probe and screening diffuse layers located in the liquid next to the surfaces. This structure called electric double layers [5]. The double layers are characterized with certain thickness called Debye length and there is a potential drop across them—zeta potential ($\zeta$). There are several papers dedicated to theoretical and experimental studies of these effects [7-23].

It turns out that these electroacoustic phenomena can be used for characterizing porous materials, in particular, pore size, Zhu et al. 2008 [15]. Applicants elaborate on this application for the seismo-electric current in the instant application. The present invention is valid for electro-seismic effect as well.

Measurement of the seismoelectric current presents no problem with present commercially available instruments, as it was shown in papers by Dukhin et al. in 2010 [11, 22, 23].

Still, interpretation presents certain challenges. There is no general theory that would be valid for any combination of parameters. Instead, there are several theories, each of them limited to a certain range of parameters. This is a result of the multiple effects that might take place inside of the pores when ultrasound propagates through them. Therefore, interpretation becomes a main element of characterization procedure. Different pore size ranges require different interpretation procedures, which might be subjects for different patents.

Applicants show herein that interpretation could make characterization procedure independent of the calibration with material having known pore size. Such absolute methods are very rare and very valuable due to simplicity and high reliability.

There are three distinctively different ranges of pore sizes. Each of them requires different interpretation procedure for calculating pore size from the measured signal.

Range of Small Pores with Overlapped Double Layers.

This range covers pore size up to 200 nanometers. Consequently it includes porous materials with micropores, pore size <2 nm; mesopores, pore size is between 2 and 50 nm and small macropores, with pore size >50 nm and <300 nm.

Thickness of the electric double layers inside of the probes can be comparable with size of the pores in this range. As a result, double layers located on the opposite sides of the pore overlap. This overlap can be enforced by reducing ionic strength of the wetted liquid. Debye length of the double layers formed in the distilled water does not exceed 50 nm. This limits size of the pores with double layers overlap.

There is U.S. Pat. No. 8,281,662 issued Oct. 9, 2012 to Dukhin, Goetz and Thommes claiming application of the overlapped double layers mode for characterizing pore size. The method is not absolute, it requires calibration with material having known pore size.

Range of Intermediate Pore Size, Smoluchwski Range [6].

There is no pore size dependence of the measured electroacoustic signal. This is the range where Smoluchwski type electroacoustic theories are valid. Such theories are summarized in the ISO standard 13099 Part 1, 2012. This range is the most suited for determining zeta potential of pores, instead of pore size.

Values of pore sizes that belong to this range depend on the frequency of ultrasound. For the frequency of 1 MHz, this range encompasses pores with sizes roughly 200 nm up to 1 micron. Higher frequency would shift top limit of the pore size range to lower values.

Range of Large Pores with Deviation from Steady Hydrodynamic Poiselle Profile.

Space distribution of the hydrodynamic flow through a pore generated by a constant gradient of pressure is described by parabolic Poiselle profile [3, 4]. This distribution remains valid for oscillating gradient of pressure if frequency of oscillation is low enough. Then Poiselle profile becomes established at any point of time due to slow changing pressure gradient.

This steady state distribution becomes distorted when frequency of oscillation (ultrasound frequency f) becomes high enough. According to Biot [3, 4] one may assume that the Poiselle flow breaks down for a given frequency when the pore size d becomes larger than a certain critical value $d_{cr}$:

$$d > d_{cr} = \sqrt{\frac{\pi v}{4f}} \tag{1}$$

where ν is kinematic viscosity.

If pore size exceeds this critical value for a given frequency (see Eq. 3), then the hydrodynamic flow oscillates too fast, steady state of the Poiselle profile cannot be reached, and then the seismo-electric current becomes dependent on the pore size. For water and the frequency 3 MHz, this is expected to occur for the pore diameter above approximately 0.5 micron.

It turns out that at the larger pore sizes where the hydrodynamic relaxation effect dominates the seismo-electric current decreases with increasing pore size. This is opposite to the effect of the overlapping double layers. There is experiment published in the paper by Dukhin et al in 2013 that confirms this dependence. FIG. 1 demonstrates results of this experiment. This effect can be separated from the effect of the overlapped double layers by selecting wetting/conducting liquid with sufficiently high ionic strength.

This experiment was performed on a series of monolithic resorcinol based organic aerogels, which serve as pre-cursor for carbon aerogels, see Reichenauer in 2005. These materials exhibit essentially identical porosity (ca. 70%) but vary in pore diameter from ca. 1 um up to 8 um. The pore diameters were determined by mercury porosimetry.

This experiment confirmed theoretically predicted role of the hydrodynamic relaxation in the seismoelectric effect.

There is at least one known analytical theory that describes effect of hydrodynamic relaxation on electroacoustic in pores. Repper and Morgan in 2002 derived following equation for electroacoustic effect in porous material:

$$\frac{\Delta P(\omega)}{\Delta V(\omega)} = \frac{2\varepsilon\zeta\kappa}{a} \frac{\frac{J_1(\kappa a)}{J_0(\kappa a)}}{-1 + \frac{2}{\kappa a}\frac{J_1(\kappa a)}{J_0(\kappa a)}} \qquad (2)$$

where ΔP and ΔV are gradients of the seismic pressure and voltage at the angular frequency ω=2πf, ∈ is dielectric constant, α is pore radius, J is Bessel function, and $$\kappa = \sqrt{\frac{-i\omega}{\nu}} \qquad (3)$$

where i is imaginary unit.

According to this theory, seismoelectric and electroseismic signals at the frequency where hydrodynamic relaxation becomes significant should be expressed in terms of complex numbers. Critical frequency that determines this range can be calculated from the condition:

$$\kappa\alpha = 1 \qquad (4)$$

which leads to the following expression for the critical angular frequency for a given pore radius:

$$\omega_{cr} = 2\pi f_{cr} = \frac{\nu}{a^2} \qquad (5)$$

where $f_{cr}$ is critical frequency in MHz.

For pore diameter equals to 1 micron this critical frequency is roughly 1 MHz.

The critical frequency determines approximately a middle point of the range where hydrodynamic relaxation is important. We can assume that complete frequency range encompasses frequency within order of magnitude higher and lower than this critical frequency.

There was suggestion of using this theory for calculating pore size from the measured electroacoustic signal published by Zhu et al in 2008. However, there is no explanation how to conduct this calculation. This theory contains at least one unknown parameter—zeta potential (ζ) of pores surfaces. This parameter depends on chemistry of the pore surfaces, composition of the wetting liquid.

Idea suggested by Zhu et al in 2008 cannot be accomplished unless method would be suggested for dealing with this unknown parameter. That is why applicants consider that such additional method, allows elimination of this unknown parameter from the characterization procedure.

Measured electroacoustic signal is complex number that has creation magnitude and phase. Equation 2 reflects this fact. Second multiplier with Bessel functions on the right hand side of the equation is a complex function of the parameter κα. For simplicity Eq. 2 is written as follows:

$$\frac{\Delta V(\omega)}{\Delta P(\omega)} = \frac{2\varepsilon\zeta\kappa}{a} H^*(\kappa a) \qquad (6)$$

where complex function H* equals:

$$H^*(\kappa a) = \frac{\frac{J_1(\kappa a)}{J_0(\kappa a)}}{-1 + \frac{2}{\kappa a}\frac{J_1(\kappa a)}{J_0(\kappa a)}} = \text{Re } H^* + i \text{ Im } H^* \qquad (7)$$

Measurement yields information for the magnitude and phase of the electroacoustic signal.

Theoretical expression for the magnitude is following:

$$\text{Magnitude}\left(\frac{\Delta V(\omega)}{\Delta P(\omega)}\right) = \frac{2\varepsilon\zeta\kappa}{a}\sqrt{(\text{Re } H^*)^2 + (\text{Im } H^*)^2} \qquad (8)$$

It is seen that magnitude depends on the unknown parameter—zeta potential. Therefore, calculation of pore size from the electroacoustic magnitude would require calibration procedure with the same material having known pore size. Such calibration reference material can be prepared only using independent characterization method, mercury porosimetry as an example. This leads to the conclusion that calculation of pore size from the measured magnitude of the electroacoustic signal is not an absolute method.

Theoretical expression for the phase of the electroacoustic signal is quite different:

$$\text{Phase}\left(\frac{\Delta V(\omega)}{\Delta P(\omega)}\right) = \arctan\frac{\text{Im } H^*}{\text{Re } H^*} \qquad (9)$$

It is seen that the phase is independent of unknown zeta potential. Actually it would be independent on all parameters that can be presented as real numbers. They simply cancel out. This is a tremendous advantage of using phase instead of magnitude of electroacoustic signal for calculating pore size. This method would become absolute, requiring no calibration with material having known size.

This method of calculating pore size from the phase of electroacoustic signal has important advantages over alternative methods—calculation from the magnitude.

This method differs from our previous patent on this subject, the U.S. Pat. No. 8,281,662 B2 by Dukhin, Goetz and Thommes due to difference in the interpretation procedure. Our previous patent was designed for overlapped double layers and calculation of the pore size from the magnitude of the electroacoustic signal. The new proposed patent suggests calculation of the pore size from the phase of the electroacoustic signal, which is pore size dependent due to hydrodynamic relaxation in larger pores at high frequency.

This method can be applied for determination of pore size distribution as well. It would be possible if measurements conducted at multiple frequencies. Frequency dependence of electroacoustic phase contains information on the pore size distribution.

SUMMARY OF THE INVENTION

The application discloses a method of determining pore size of a porous material by transmitting ultrasound pulses at single or multiple frequencies through said material and measuring the phase of the resulting electric current, or, alternatively applying an alternating electric field and measuring the generated ultrasound pulses. The porous material must be saturated with conducting liquid. Measurement can be conducted at a single or multiple frequencies. Pore size can be calculated from the phase of the electroacoustic signal using any theory that takes into account deviation of the hydrodynamic flow in pores from the steady state of the Poiselle profile, which is refereed as hydrodynamic relaxation. Multiple frequency measurement can be used for determining pore size distribution.

With the foregoing and other objects in view there is provided, a method of determining pore size of a porous material. The method including saturating the porous material with a conducting liquid. Measuring, with an electro-acoustic device, a phase of the seismo-electric or electro-seismic signal at a single frequency. Calculating an average pore size from the measured phase of the seismo-electric or electro-seismic signal using a theory that takes into account the hydrodynamic relaxation of the conducting liquid inside of the pores of the porous material.

In accordance with another feature of the invention, the frequency equals kinematic viscosity of the conducting liquid divided by a square of an expected pore radius of the porous material.

With the objects of the invention in view, there is also provided a method of determining pore size distribution of a porous material. The method including saturating the porous material with a conducting liquid. Measuring, with an electro-acoustic device, a phase of the seismo-electric or electro-seismic signal at multiple frequencies. Calculating pore size distribution from the measured phase of the seismo-electric or electro-seismic signal using a theory that takes into account the hydrodynamic relaxation of the conducting liquid inside of the pores of the porous material.

In accordance with still a further feature of the invention, a frequency range is selected based on the condition that a middle angular frequency of the frequency range equals kinematic viscosity of the conduction liquid divided by a square of the expected pore radius of the porous material.

Although the invention is described herein as a method for determining pore size and/or pore size distribution of porous material, it is nevertheless not intended to be limited to the details shown, since various modifications and changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF INVENTION

The following detailed description of the invention includes: a description of the hardware required to practice the invention and results of measurement for one particular porous material.

Hardware Description

Figure 1:
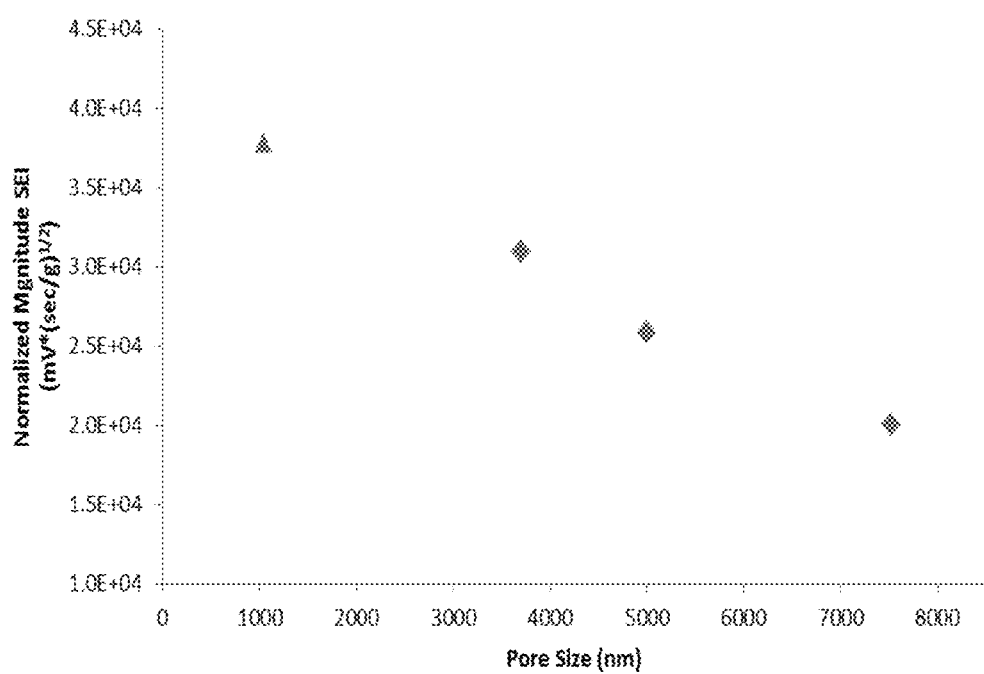
FIG. 1. Seismoelectric current versus pore size for larger pores when hydrodynamic relaxation effect becomes important. Pore size was measured with mercury porosimetry. Current is normalized with porosity. Series of monolithic organic xerogels in water.
Figure 2:
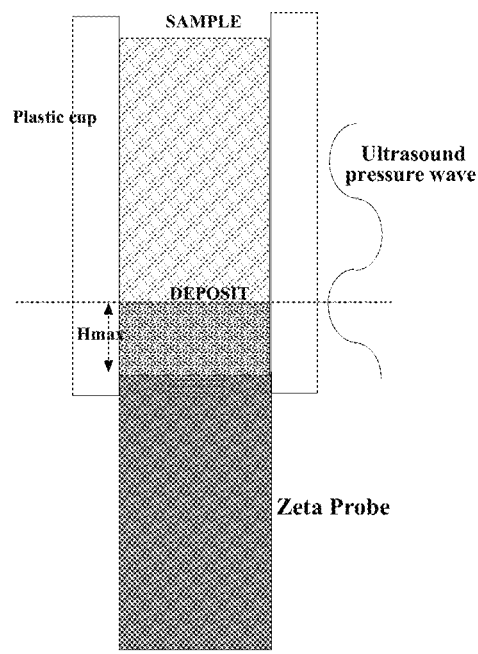
FIG. 2. Illustration of electro-acoustic probe with sample handling system that allows measurement of particulates deposits and porous bodies.

The proposed instrument for measuring seismo-electric current employs an electro-acoustic spectrometer for generating and sensing this effect. Such an electro-acoustic device is described in U.S. Pat. No. 6,449,563, to A. S. Dukhin and P. J Goetz and commercialized by Dispersion Technology as a model DT-300. We use this device to carry out the method of the present invention. The sample handling system for measuring pore size of porous particles is shown in FIG. 2. The electro-acoustic probe is placed vertically in a suitable stand that orients it such that the face of the probe with the gold electrode is on top. A cylindrical fixture around the top of the probe creates a cup with the probe face serving as a bottom of said cup. This cup is filled with a conducting liquid and a porous body can be placed in this liquid in contact with the gold electrode. Liquid should be selected based on the condition that the double layers formed on the pores surfaces do not overlap in the pore bulk and surface conductivity is negligible. This can be usually achieved with water by adding sufficient amount of electrolyte. Ultrasound pulses generated by the electro-acoustic probe enter the liquid phase through the gold electrode, whereupon they enter the porous body that is placed on top of the gold electrode. The sound wave generates a seismo-electric current as it propagates through said porous body and is sensed as an alternating current between the gold electrode and its surrounding stainless steel shell. The electronics measures and processes these current pulses, using a computer, in a manner similar to the electro-acoustic pulses generated by dispersed particles as described in said patent.

This electroacoustic probe is calibrated with reference material silica Ludox™ at 10% wt. This dispersion has well defined zeta potential at −38 mV. There is no calibration with porous material having known pore size was applied.

Figure 3:
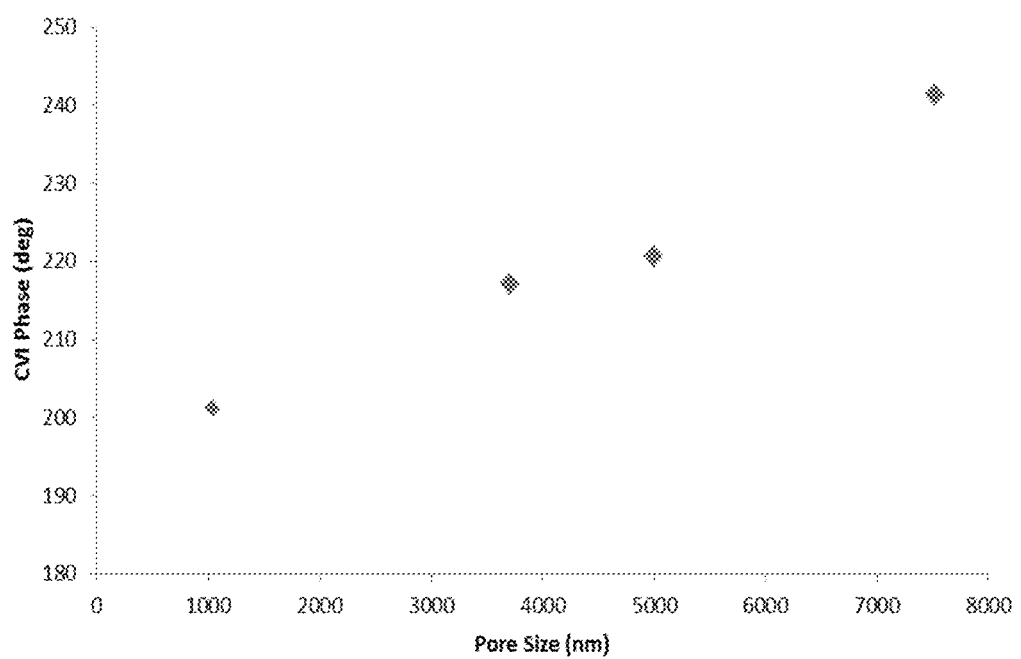
FIG. 3. Seismo-electric current phase as a function of pore size for the same systems as presented on FIG. 1.

The experiment was performed on a series of monolithic resorcinol based organic aerogels, which serve as pre-cursor for carbon aerogels, see Reichenauer in 2005. These porous materials were saturated with conducting liquid with low ionic strength—distilled water. However double layers were not overlapped due large pore size. FIG. 3 demonstrates that phase of electroacoustic seismo-electric current is pore size dependent indeed.

Calculation of the pore size from the measured phase can be conducted using any theory that takes into account hydrodynamic relaxation in pores. Such calculation can be performed by a computer programmed with a computer program in non-transitory form to perform the above noted theories. As an example we can apply theory, Repper and Morgan in 2002. Equation 9 for electroacoustic phase can be detailed further by extracting real and imaginary parts of H* function:

$$\text{Phase}\left(\frac{\Delta V(\omega)}{\Delta P(\omega)}\right) = \arctan\frac{\text{Im } H^*}{\text{Re } H^*} = \frac{(\text{Im } J - \text{Re } J)(2 \text{ Re } J - g) - (\text{Re } J + \text{Im } J)(2 \text{ Im } J + g)}{(\text{Re } J + \text{Im } J)(2 \text{ Re } J - g) + (\text{Im } J - \text{Re } J)(2 \text{ Im } J + g)} \quad (10)$$

where:

$$g = \sqrt{\frac{\omega a^2}{2\nu}} \quad (11)$$

$$\text{Re } J = \frac{\text{Re } J_1(\kappa a) \text{ Re } J_0(\kappa a) + \text{Im } J_1(\kappa a) \text{ Im } J_0(\kappa a)}{\text{Re}^2 J_0 + \text{Im}^2 J_0} \quad (12)$$

$$\text{Im } J = \frac{\text{Im } J_1(\kappa a) \text{ Re } J_0(\kappa a) - \text{Re } J_1(\kappa a) \text{ Im } J_0(\kappa a)}{\text{Re}^2 J_0 + \text{Im}^2 J_0} \quad (13)$$

Bessel functions $J_1$ and $J_0$ of complex numbers are tabulated. Substituting experimental value of the phase in the left hand side of the Equation 10 reduces the number of unknown parameters in the system of the Equations 10-13 to just one—pore radius. Two other parameters in the Equation 11 are known—frequency of ultrasound and kinematic viscosity of the liquid. Therefore, pore size can be calculated using this system of equations.

Figure 4:
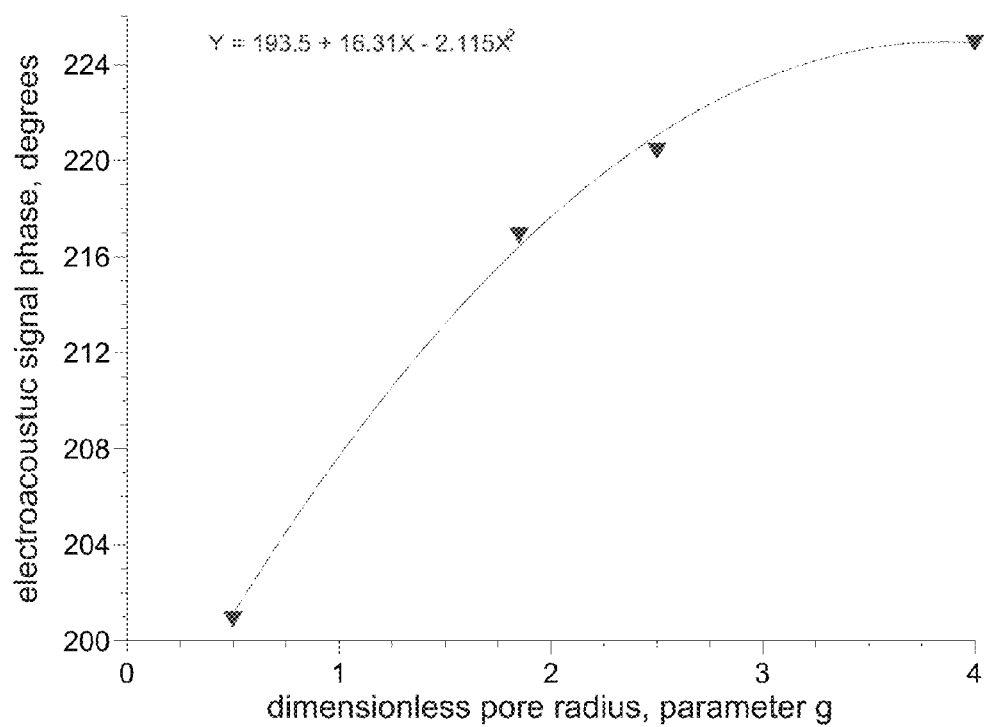
FIG. 4. Seismoelectric current phase for the sample same as on FIGS. 1 and 3 as a function of dimensionless parameter characterizing pore size at the ultrasound frequency 3 MHz.

There is alternative semi-empirical approach for calculating pore size from the electroacoustic phase. We can use experimental data presented on FIG. 3 and plot it as a function of parameter g. Then we can use polynomial fit. The corresponding function is shown on FIG. 4.

$$\text{Phase\_Fit} = 193.5 + 16.31\ g - 2.115\ g^2 \quad (14)$$

This dependence should be universal, independent on the properties that are defined as real numbers. There is only one known factor that can affect this expression—geometry of the pores. Biot 1956 [4] shows that geometry of the pores does not affect functional dependence of hydrodynamic relaxation on frequency. It just shifts the frequency scale by multiplier that depends on geometry of the pores. This means that parameter g might contain an unknown multiplier that would depend on pore geometry. There is not enough data yet for deriving conclusion regarding value of the multiplier for different systems.

Collecting more data would lead to modifications of the Phase_Fit function. Expression given with Equation 14 is not final. However, the main approach and its justification would be same as described and claimed in this patent.

Calculated pore size and/or pore size distribution is presented in either digital or graphical format using available user interface. Likewise it is possible to print the calculated pore size and/or pore size distribution to a printer.

U.S. PATENT DOCUMENTS

| | | | |
|---|---|---|---|
| 7,340,348 | March 2008 | Strack et al. | 702/14 |
| 6,449,563 | September 2002 | Dukhin et al. | 702/22 |
| 8,281,662 | October 2012 | Dukhin et al. | 73/647 |

OTHER PUBLICATIONS

1. Lowell, S., Shields, J. E., Thomas, M. A. and Thommes, M. "Characterization of porous solids and powders: surface area, pore size and density", Kluwer Academic Publishers, The Netherlands, (2004).
2. Frenkel J. "On the Theory of Seismic and Seismoelectric Phenomena in a Moist Soil", J. of Physics, USSR, vol. 3, 5, pp. 230-241 [1944], re-published J. Engineering Mechanics, (2005).
3. Biot, M. A. "Theory of propagation of elastic waves in a fluid-saturated porous solid. 1. Low frequency range. J. Acoustic Society of America, vol. 28, 2, pp. 168-178 (1956)
4. Biot, M. A. "Theory of propagation of elastic waves in a fluid-saturated porous solid. 1. High frequency range. J. Acoustic Society of America, vol. 28, 2, pp. 179-191 (1956)
5. Lyklema, J., "Fundamentals of Interface and Colloid Science", vol. 1-3, Academic Press, London-NY, (1995-2000).
6. International Standard ISO 13099 Part 1 "Colloidal systems-Methods for zeta-potential determination—Part 1. Electroacoustic and electrokinetic phenomena", (2012).
7. Ivanov, A. G. Bull. Academy of Sciences, USSR, Serie geographique et geophysique, no. 5, 699, (1940)
8. Williams M., "An Electrokinetic Transducer", The review of scientific instruments, 19, 10, 64-645 (1948)
9. Dukhin, A. S. Observation of sol-gel transition for carbon nanotubes using electroacoustics: Colloid vibration current versus streaming vibration current. JCIS, 310, 1, 270-280 (2007)
10. Muller, E. and Mann, C. "Resin characterization by electro-acoustic measurements", J. of Chromatography A, 1144, 30-39, (2007).
11. Dukhin, A. S. and Goetz, P. J. "Ultrasound for characterizing liquids, nano- and micro-particulates, and porous bodies", Elsevier (2010)
12. Markov, M. G. "Simulation of the electroseismic effect produced by an acoustic multiple source in a fluid-filled borehole", SPWLA 45th Annual Logging Symposium, (2004)
13. Zhu, Z., Burns, D. R. and Toksoz, M. N. "Electroseismic and seismoelectric measurements of rock samples in a water tank", MIT (2007)
14. Zhu, Z., Haarsten, M. W. and Toksoz, M. N. "Experimental studies of electrokinetic conversion in fluid-saturated borehole", Geophysics, 64, 1349-1356 (1999)
15. Zhu, Z., Toksoz, M. F. and Burns, D. R. "Electroseismic and seismoelectric measurement of rock samples in water tank", Geophysics, 73, E153 (2008)
16. Pride, S. R. and Haartsen, M. W. "Electroseismic waves properties", J. Acoust. Soc. Amer., 100, 1301-1315 (1996)
17. Pride, S. R. "Govering equations for the coupled electromagnetic and acoustics of porous media", Physical Review, B, 50, 15678-15696 (1994)

18. Haarsten, M. W. and Pride, S. R. "Electroseismic waves from point sources in layered media", J. of Geophysical Research, 102, 24745-24769 (1997)
19. Mikhailov, O., Queen, J. and Toksoz, M. N. "Using borehole seismic measurements to detect and characterize fractured zones", Geophysics, 65, 1098-1112 (2000)
20. Thomson, A. and Gist, G. "Geophysical applications of electrokinetic conversion", The Leading Edge, 12, 1169-1173 (1993)
21. Reppert, P. M. and Morgan, F. D. "Frequency dependent electrosmosis", J. Colloid and Interface Science, 254, 372-383 (2002)
22. Dukhin, A. S. and Shilov, V. N. "Seismoelectric effect.: A non-isochoric streaming current. 2. Theory", J. Colloid and Interface Science, 346, p. 248-253 (2010)
23. Dukhin, A. S., Goetz, P. J, and Thommes, M. "Seismo-electric effect.: A non-isochoric streaming current. 1. Experiment", J. Colloid and Interface Science, 345, p. 547-553 (2010)
24. G. Reichenauer, Micropore adsorption dynamics in synthetic hard carbons, Adsorption 11 467-471 (2005)
25. Dukhin, A. S., Swasey, S. and Thommes, M. "A method for pore size and porosity analysis of porous materials using electroacoustics and high frequency conductivity", Colloids and Surfaces, (2013)

We claim:

1. A method of determining pore size of a porous material comprising:
    saturating the porous material with a conducting liquid;
    measuring, with an electro-acoustic device, a phase of a seismo-electric or electro-seismic signal within the porous material at a single frequency;
    calculating an average pore size from the phase of the seismo-electric or electro-seismic signal using a theory that takes into account a hydrodynamic relaxation of the conducting liquid inside of pores of the porous material, which occurs when $d > d_{cr} = \sqrt{\pi v / 4f}$, where d is an average pore diameter of the porous material, v is a kinematic viscosity of the conducting liquid within the porous material, and f is the frequency of the seismo-electric or electro-seismic signal; and the conducting liquid having an ionic strength sufficient to distinguish the hydrodynamic relaxation from an effect of overlapping double layers.

2. The method according to claim 1, wherein the frequency equals kinematic viscosity of the conducting liquid divided by a square of an expected pore radius of the porous material.

3. A method of determining pore size distribution of a porous material comprising:
    saturating the porous material with a conducting liquid;
    measuring, with an electro-acoustic device, a phase of a seismo-electric or electro-seismic signal within the porous material at multiple frequencies;
    calculating a pore size distribution from the phase of the seismo-electric or electro-seismic signal using a theory that takes into account a hydrodynamic relaxation of the conducting liquid inside of pores of the porous material, which occurs when $d > d_{cr} = \sqrt{\pi v / 4f}$, where d is an average pore diameter of the porous material, v is a kinematic viscosity of the conducting liquid within the porous material, and f is the frequency of the seismo-electric or electro-seismic signal; and the conducting liquid having an ionic strength sufficient to distinguish the hydrodynamic relaxation from an effect of overlapping double layers.

4. The method according to claim 3, wherein a frequency range is selected based on the condition that a middle angular frequency of the frequency range equals kinematic viscosity of the conducting liquid divided by a square of an expected pore radius of the porous material.

* * * * *